United States Patent
Pearman et al.

(10) Patent No.: US 12,350,759 B2
(45) Date of Patent: *Jul. 8, 2025

(54) SCREW LOCK FOR SECURING WELDING LEAD CONNECTORS TOGETHER

(71) Applicant: Alpha/Omega Energy Solutions, LLC, Cumberland Gap, TN (US)

(72) Inventors: Bradley Lance Pearman, Cumberland Gap, TN (US); Cayman Lee Ellis, Madeira Beach, FL (US)

(73) Assignee: Alpha/Omega Energy Solutions, LLC, Cumberland Gap, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,591

(22) Filed: Apr. 2, 2024

(65) Prior Publication Data
US 2024/0246178 A1   Jul. 25, 2024

Related U.S. Application Data

(63) Continuation of application No. 17/191,236, filed on Mar. 3, 2021, now Pat. No. 11,951,573.

(51) Int. Cl.
*B23K 35/02* (2006.01)
*F16B 7/18* (2006.01)
*H01R 9/11* (2006.01)
*H01R 13/52* (2006.01)

(52) U.S. Cl.
CPC ............ *B23K 35/0261* (2013.01); *F16B 7/18* (2013.01); *H01R 9/11* (2013.01); *H01R 13/5213* (2013.01)

(58) Field of Classification Search
CPC .. H01R 13/6397; H01R 4/70; H01R 13/5213; H01R 9/11; H01R 33/97; H01R 33/971
See application file for complete search history.

(56) References Cited

U.S. PATENT DOCUMENTS

| | | | |
|---|---|---|---|
| 122,396 | A | 1/1872 | McIlHenny |
| 142,388 | A | 9/1873 | Goble |
| 2,518,289 | A | 4/1950 | Cox |
| 2,873,357 | A | 2/1959 | Landis |
| 2,980,790 | A | 4/1961 | Bracken |
| 4,300,373 | A | 11/1981 | Camos |

(Continued)

FOREIGN PATENT DOCUMENTS

| | | |
|---|---|---|
| CA | 552341 | 1/1958 |
| EP | 0918590 | 12/2002 |

(Continued)

OTHER PUBLICATIONS

Non-Final Office Action, U.S. Appl. No. 16/180,540 (Oct. 2, 2019).

(Continued)

*Primary Examiner* — Renee S Luebke
*Assistant Examiner* — Paul D Baillargeon
(74) *Attorney, Agent, or Firm* — Robinson IP Law, PLLC

(57) ABSTRACT

A screw lock kit and apparatus including three hollow members for securing welding lead connectors together wherein a first hollow member is held against a second hollow member by engagement of a third hollow member with the second hollow member. A method for securing welding lead connectors together using the screw lock apparatus.

5 Claims, 8 Drawing Sheets

(56) References Cited

U.S. PATENT DOCUMENTS

| | | |
|---|---|---|
| 4,381,063 A | 4/1983 | Leong |
| 4,458,923 A | 7/1984 | Burroughs |
| 4,541,256 A | 9/1985 | Green |
| 4,643,505 A | 2/1987 | House |
| 4,826,215 A | 5/1989 | Sullivan |
| 4,909,756 A | 3/1990 | Jervis |
| 5,015,013 A | 5/1991 | Nadin |
| 5,052,939 A | 10/1991 | Koch |
| 5,061,194 A | 10/1991 | Herman et al. |
| 5,129,839 A | 7/1992 | Vanskiver |
| 5,139,429 A | 8/1992 | Herman et al. |
| 5,193,366 A | 3/1993 | Brinkman |
| 5,217,387 A | 6/1993 | Hull et al. |
| 5,347,084 A | 9/1994 | Roney |
| 5,379,836 A | 1/1995 | Jordan |
| 5,525,073 A | 6/1996 | Sampson |
| 5,821,462 A | 10/1998 | Raleigh |
| 5,844,171 A | 12/1998 | Fitzgerald |
| 6,074,238 A | 6/2000 | DeRoss |
| 6,099,340 A | 8/2000 | Florentine |
| 6,149,445 A | 11/2000 | Daddono |
| 6,171,132 B1 | 1/2001 | Schmidt |
| 6,184,492 B1 | 2/2001 | Busopulos |
| 6,250,946 B1 | 6/2001 | Tardy |
| 6,280,235 B1 | 8/2001 | Radliff |
| 6,913,294 B2 | 7/2005 | Treverton |
| 7,077,681 B2 | 7/2006 | Behoo |
| 7,285,725 B1 | 10/2007 | Saman |
| 7,384,297 B2 | 6/2008 | King, Jr. et al. |
| 7,431,611 B2 | 10/2008 | King, Jr. et al. |
| 7,550,672 B2 | 6/2009 | Chadbourne |
| 7,628,428 B2 | 12/2009 | Rampton |
| 7,722,086 B2 | 5/2010 | Ishiki |
| 8,408,929 B2 | 4/2013 | Solon |
| 8,450,648 B2 | 5/2013 | Langley |
| 8,870,587 B2 | 10/2014 | Nooner et al. |
| 8,875,792 B2 | 11/2014 | Whitelaw |
| 9,211,602 B1 | 12/2015 | Carney et al. |
| 10,056,745 B2 | 8/2018 | Nooner et al. |
| 10,431,930 B1 | 10/2019 | Pearman |
| 10,658,790 B2 | 5/2020 | Finona |
| 10,720,731 B2 | 7/2020 | Pearman |
| 10,746,329 B2 | 8/2020 | Pearman |
| 10,749,296 B2 | 8/2020 | Pearman |
| 10,870,163 B1 | 12/2020 | Pearman |
| 11,271,342 B2 | 3/2022 | Bobelis |
| 11,951,573 B2 * | 4/2024 | Pearman ................ F16B 7/18 |
| 2002/0092837 A1 | 7/2002 | Keats |
| 2004/0097120 A1 | 5/2004 | Limber et al. |
| 2004/0144758 A1 | 7/2004 | Onishi |
| 2005/0136716 A1 | 6/2005 | Behoo |
| 2010/0126977 A1 | 5/2010 | Langley |
| 2012/0064744 A1 | 3/2012 | Messner |
| 2013/0119041 A1 | 5/2013 | Humenik |
| 2013/0212842 A1 | 8/2013 | Rigollet et al. |
| 2014/0038470 A1 | 2/2014 | Aune, Jr. |
| 2015/0069114 A1 | 3/2015 | Sunger et al. |
| 2015/0354730 A1 | 12/2015 | Plunkett |
| 2017/0087658 A1 | 3/2017 | Townsend |
| 2018/0166871 A1 | 6/2018 | Nooner et al. |
| 2018/0368536 A1 | 12/2018 | Newsom |
| 2020/0141524 A1 | 5/2020 | Pearman |
| 2020/0144767 A1 | 5/2020 | Pearman |
| 2020/0144768 A1 | 5/2020 | Pearman |

FOREIGN PATENT DOCUMENTS

| | | |
|---|---|---|
| GB | 907905 | 10/1962 |
| GB | 931500 | 7/1963 |
| GB | 1327584 | 8/1973 |
| WO | 9749519 | 12/1997 |
| WO | 2015047552 | 4/2015 |

OTHER PUBLICATIONS

Non-Final Office Action, U.S. Appl. No. 16/588,136 (Jan. 17, 2020).
Non-Final Office Action, U.S. Appl. No. 16/561,854 (Jan. 17, 2020).
International Search Report and Written Opinion of the International Searching Authority, Int. App. No. PCT/US19/59341, Jan. 21, 2020.
International Search Report and Written Opinion of the International Searching Authority, Int. App. No. PCT/US19/59339, Jan. 21, 2020.
International Search Report of the International Searching Authority, Int. App. No. PCT/US21/27685, May 12, 2021.
Written Opinion of the International Searching Authority, Int. App. No. PCT/US21/27685, May 12, 2021.
Non-Final Office Action, U.S. Appl. No. 17/191,236 (Mar. 3, 2021).

* cited by examiner

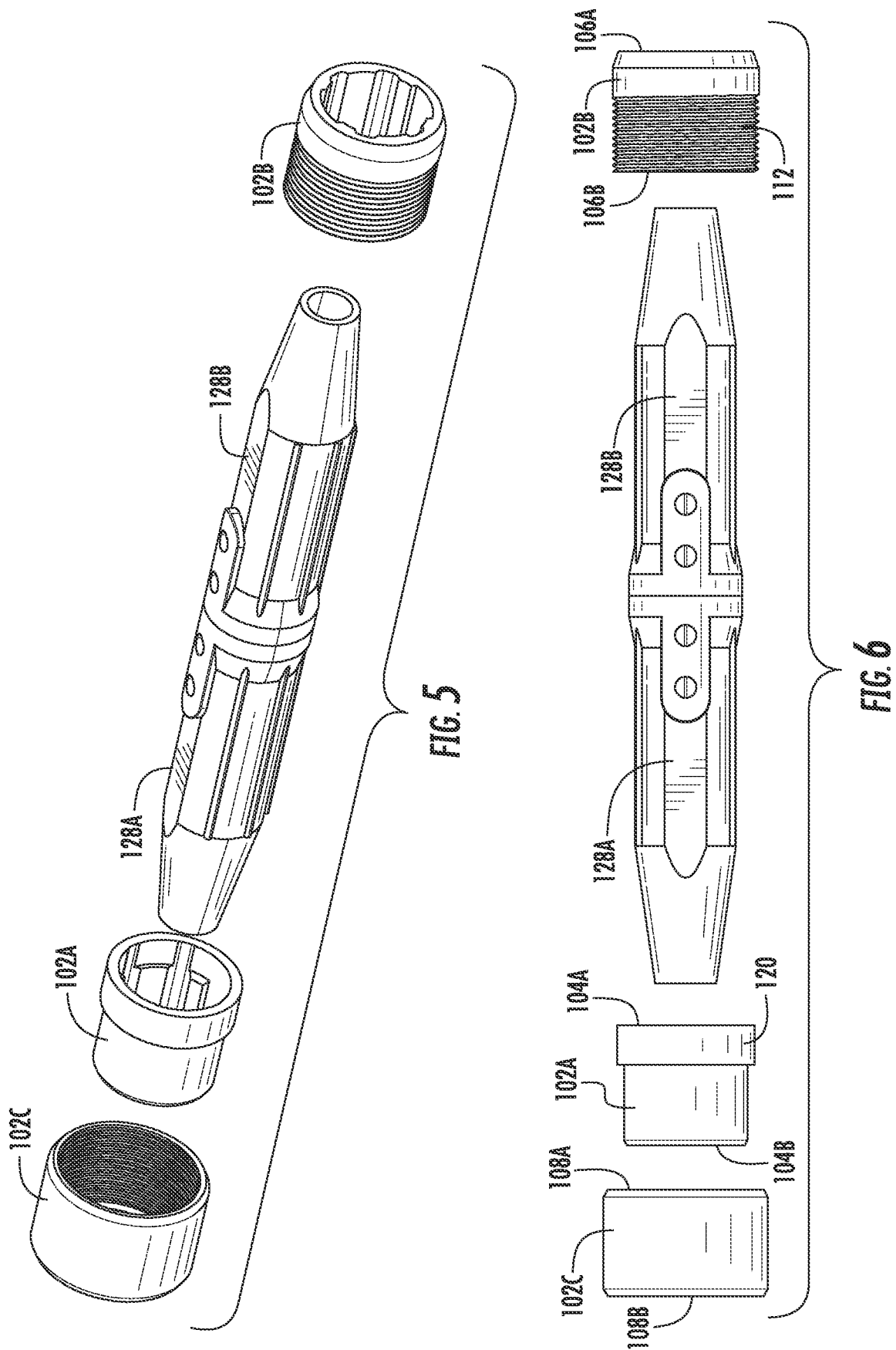

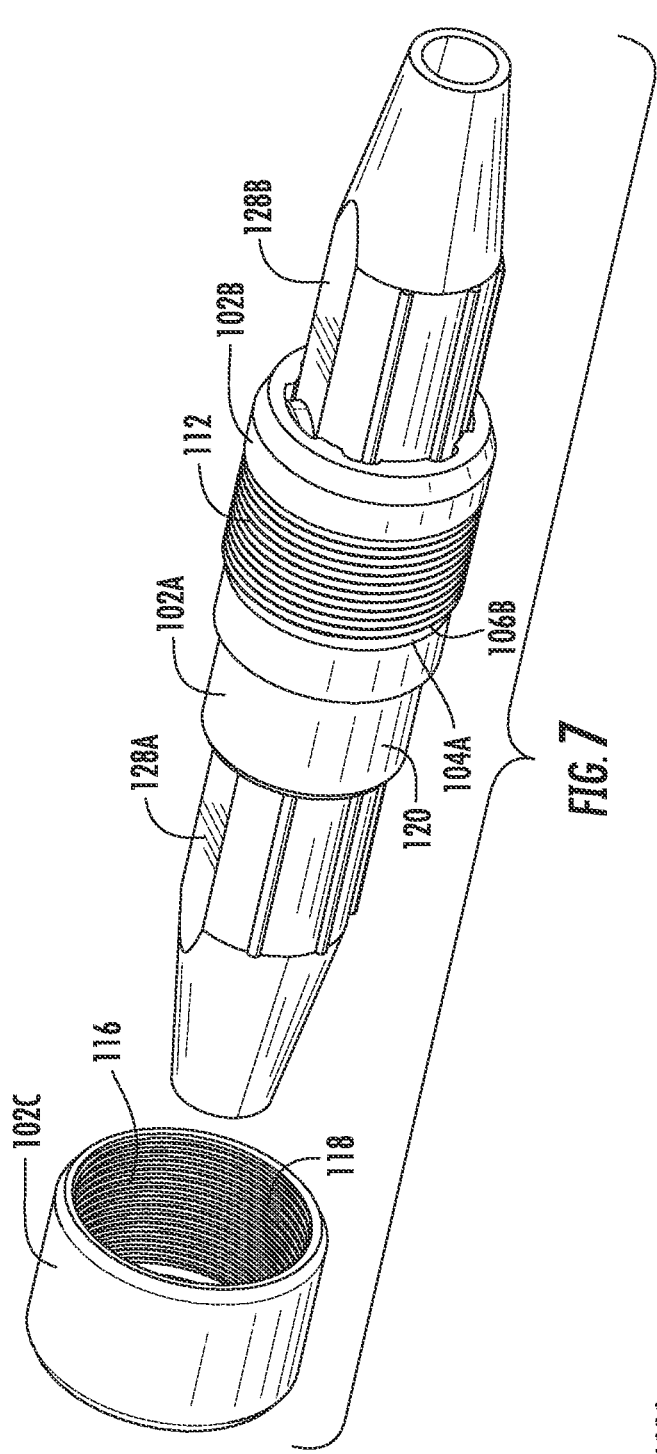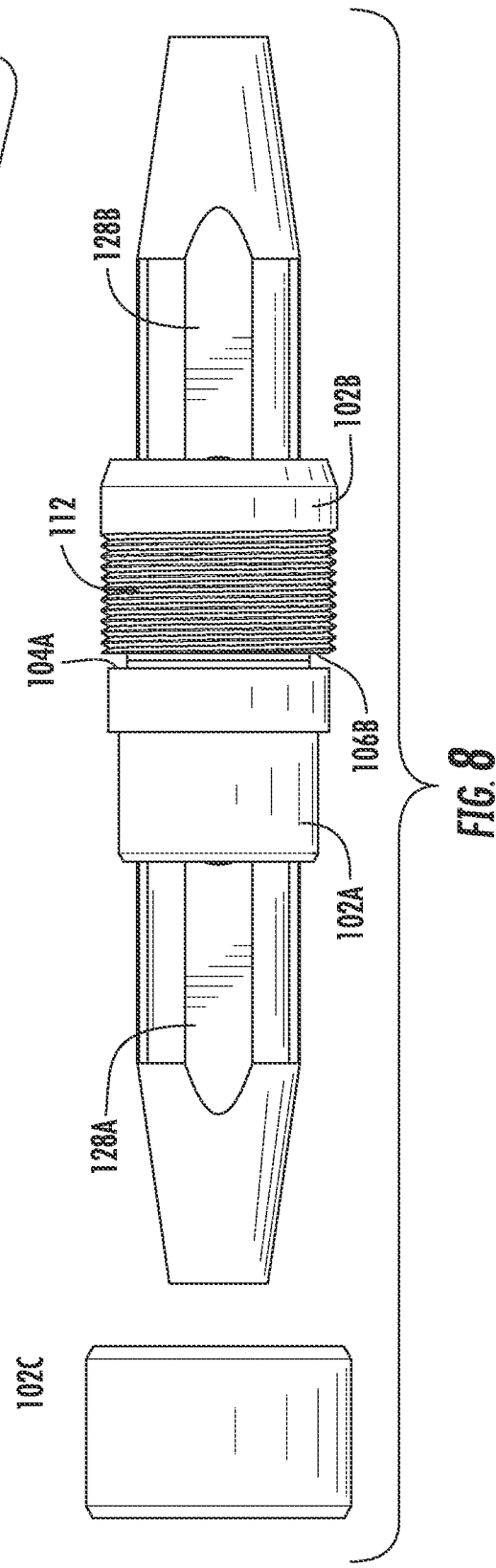

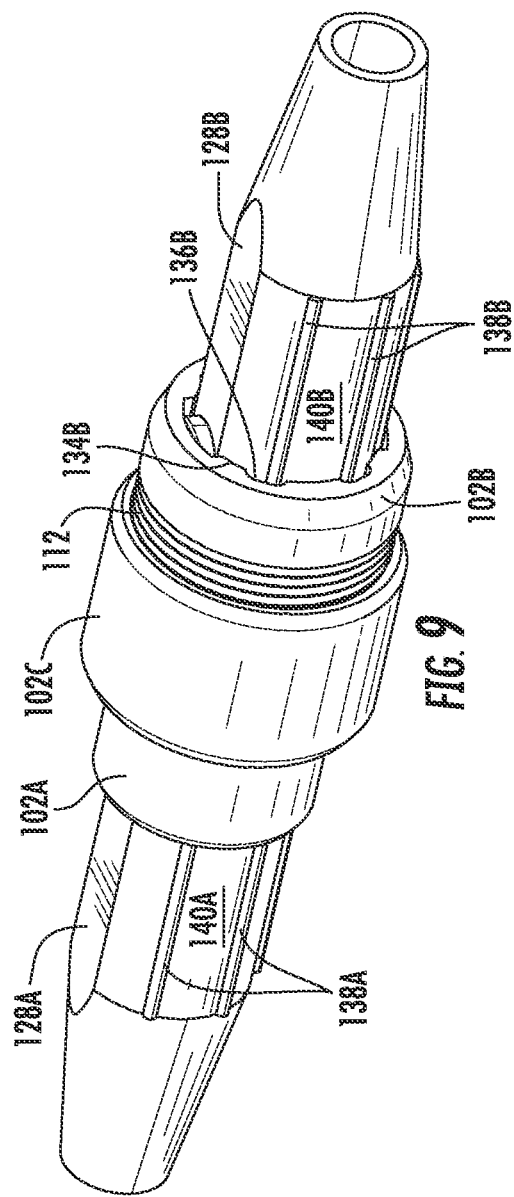
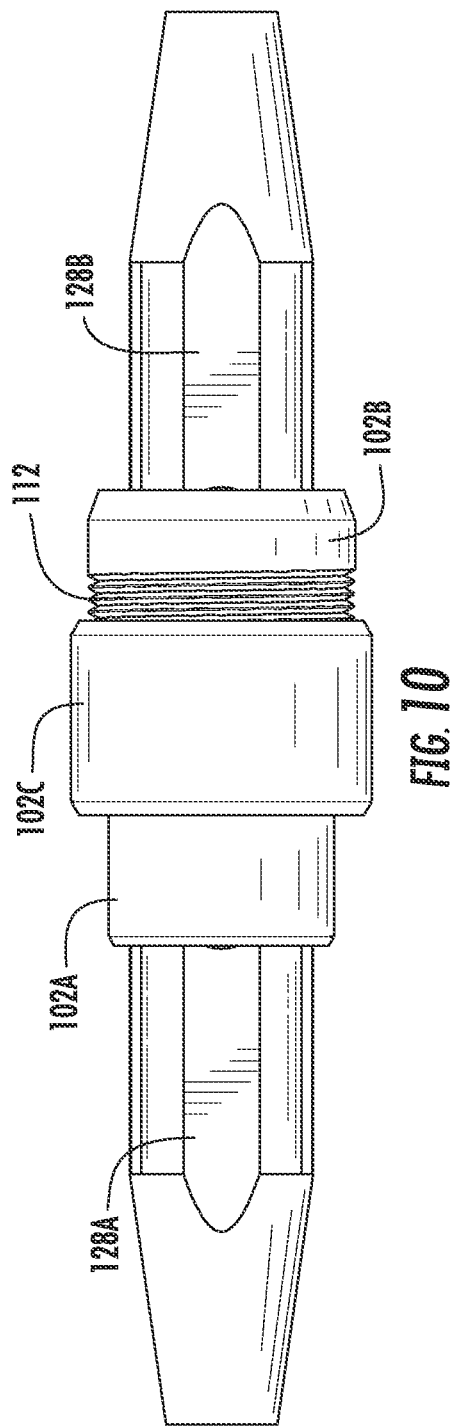

SCREW LOCK FOR SECURING WELDING LEAD CONNECTORS TOGETHER

FIELD

This disclosure relates to the field of welding. More particularly, this disclosure relates to an apparatus for securing welding lead cable connectors together.

BACKGROUND

Welding leads (or "welding cable") is an electrical conductor for transmitting a welding current used for welding materials together (e.g., for arc welding or resistance welding). Welding leads typically include small copper strands wrapped together inside a nonconductive outer layer. Such leads typically have enlarged ends in the form of cable connectors wherein one end is typically a male end and the other a female end with both make and female features being highly conductive.

Welding leads can be both dangerous and expensive. Some dangers include potential electrocution if the connection between a first welding lead cable connector connected to a second welding leads cable connector becomes loose and conductive material is exposed outside or otherwise being the nonconductive outer layer of the welding leads. Although some welding leads have features that help to better secure a connection between other welding leads, connections between welding lead cable connectors can still easily become loose or become disengaged altogether. The relative ease at which such leads can be disconnected also makes them susceptible to theft.

What is needed, therefore, is a device and method to overcome the issues mentioned above related to common welding leads.

SUMMARY

The above and other needs are met by an apparatus for securing a first welding to a second welding lead. In one embodiment, the apparatus includes a first hollow member defining a first hollow member space, a second hollow member defining a second hollow member space, and a third hollow member defining a third hollow member space. The first hollow member further includes a first end, a second end, and an outward facing first ridge along the first end of the first hollow member. The second hollow member further includes a first end, a second end, and a first screw thread along an outer surface of the second hollow member. The third hollow member includes a first end; a second end; a second screw thread along an interior surface of the third hollow member wherein the second screw thread is engaged with the first screw thread of the second hollow member; and an inward facing second ridge along the first end of the third hollow member wherein the inward facing second ridge is adjacent to the outward facing first ride of the first hollow member and blocks the outward facing first ridge from moving relative to the inward facing second ridge, thereby securing the first hollow member to the second hollow member.

The first hollow member preferably further comprises a first plurality of parallel lengthwise ridges along an inner surface of the first hollow member wherein the first plurality of ridges define a first plurality of parallel lengthwise channels along the inner surface of the first hollow member, wherein the first plurality of channels are configured to physically accommodate lengthwise ridges along a welding lead connector when the first hollow member is slid onto a welding lead connector.

The second hollow member preferably further comprises a second plurality of parallel lengthwise ridges along an inner surface of the second hollow member wherein the second plurality of ridges define a second plurality of parallel lengthwise channels along the inner surface of the second hollow member, wherein the second plurality of channels are configured to physically accommodate lengthwise ridges along a welding lead connector when the second hollow member is slid onto a welding lead connector.

In on embodiment, the second hollow member preferably further comprises a first plurality of parallel lengthwise ridges along an inner surface of the second hollow member wherein the first plurality of ridges define a first plurality of parallel lengthwise channels along the inner surface of the second hollow member, wherein the first plurality of channels are configured to physically accommodate lengthwise ridges along a welding lead connector when the second hollow member is slid onto a welding lead connector.

In another aspect, a kit of disassembled parts of a screw lock apparatus for securing a first welding to a second welding lead is disclosed. The kit comprises a first hollow member defining a first hollow member space, a second hollow member defining a second hollow member space, and a third hollow member defining a third hollow member space. The first hollow member further includes a first end, a second end, and an outward facing first ridge along the first end of the first hollow member. The second hollow member further includes a first end, a second end, and a first screw thread along an outer surface of the second hollow member. The third hollow member includes a first end, a second end, a second screw thread along an interior surface of the third hollow member, and an inward facing second ridge along the first end of the third hollow member.

In the kit described above, the first hollow member preferably further comprises a first plurality of parallel lengthwise ridges along an inner surface of the first hollow member wherein the first plurality of ridges define a first plurality of parallel lengthwise channels along the inner surface of the first hollow member, wherein the first plurality of channels are configured to physically accommodate lengthwise ridges along a welding lead connector when the first hollow member is slid onto a welding lead connector.

In the kit described above, the second hollow member preferably further comprises a second plurality of parallel lengthwise ridges along an inner surface of the second hollow member wherein the second plurality of ridges define a second plurality of parallel lengthwise channels along the inner surface of the second hollow member, wherein the second plurality of channels are configured to physically accommodate lengthwise ridges along a welding lead connector when the second hollow member is slid onto a welding lead connector.

In an alternate embodiment of the kit described above, the second hollow member preferably further comprises a first plurality of parallel lengthwise ridges along an inner surface of the second hollow member wherein the first plurality of ridges define a first plurality of parallel lengthwise channels along the inner surface of the first hollow member, wherein the first plurality of channels are configured to physically accommodate lengthwise ridges along a welding lead connector when the second hollow member is slid onto a welding lead connector.

In another aspect, a method for securing a first welding lead connector to a second welding lead connector is disclosed. The method comprises connecting the first welding lead connector to the second welding lead connector; sliding a first hollow member onto the first welding lead connector; sliding a second hollow member onto the second welding lead connector wherein a first end of the first hollow member is proximate to a second end of the second hollow member; sliding a third hollow member onto the first hollow member; screwing the third hollow member onto the second hollow member wherein a first screw thread on an inner surface of the third hollow member engages with a second screw thread on an outer surface of the second hollow member and wherein the third hollow member covers a first end of the first hollow member and a second end of the second hollow member. In some embodiments, the screwing step further comprises screwing the third hollow member onto the second hollow member until a first ridge extending outwardly from an outer surface of the second end of the first hollow member is adjacent to a second ridge extending inwardly from an inner surface of the third hollow member.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 5 shows a drawing of a perspective view of the parts of the screw lock apparatus before they have been engaged onto a pair of connected welding lead connectors;

FIG. 6 shows a drawing of a side view of the parts of the screw lock apparatus before they have been engaged onto a pair of connected welding lead connectors;

FIG. 7 shows a drawing of a perspective view of the screw lock apparatus wherein the first hollow member has been slid onto a first welding lead connector and the second hollow member has been slid onto a second welding lead connector with the first end of the first hollow member abutting a second end of the second hollow member;

FIG. 8 shows a drawing of a side view of the screw lock apparatus wherein the first hollow member has been slid onto a first welding lead connector and the second hollow member has been slid onto a second welding lead connector with the first end of the first hollow member abutting a second end of the second hollow member;

FIG. 9 shows a drawing of a perspective view of the screw lock apparatus in an assembled configuration assembled onto a pair of welding lead connectors;

FIG. 10 shows a drawing of a side view of the screw lock apparatus in an assembled configuration assembled onto a pair of welding lead connectors;

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Figure 1:
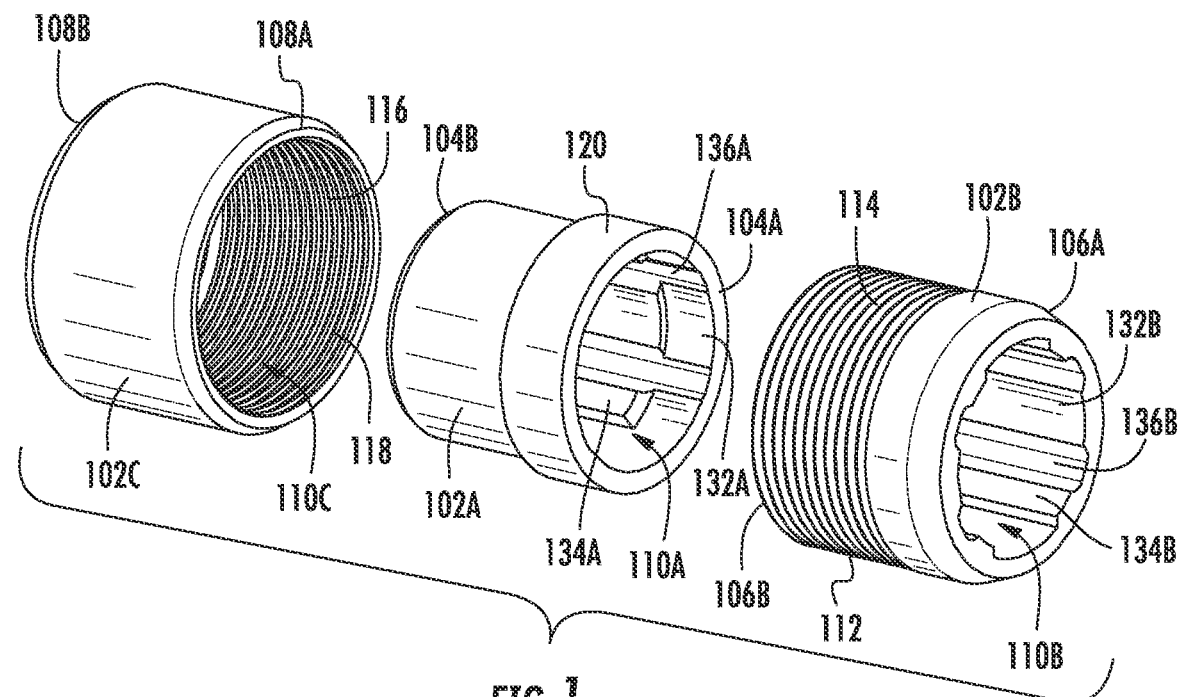
FIG. 1 shows a drawing of a perspective view showing three parts of a screw lock apparatus for securing two welding lead connectors together wherein the screw lock apparatus includes a first hollow member, a second hollow member, and a third hollow member.
Figure 2:
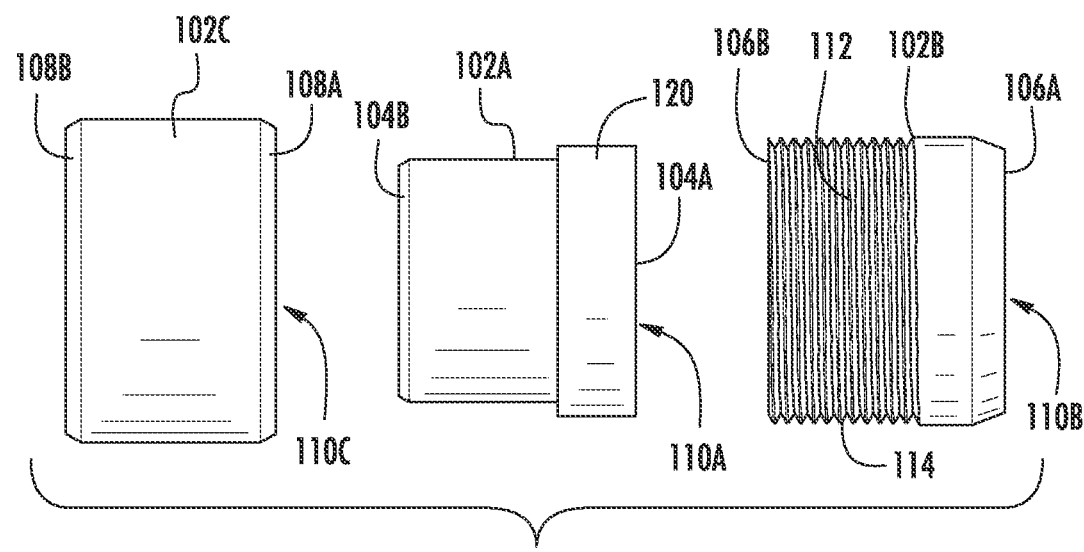
FIG. 2 shows a drawing of a side view of the three parts of the screw lock apparatus shown in FIG. 1.

FIG. 1 and FIG. 2 show a three-part screw lock apparatus 100 for securing welding leads together. The screw lock apparatus 100 includes a first hollow member 102A including a first end 104A and a second end 104B, a second hollow member 102B including a first end 106A and second end 106B, and a third hollow member 102C including a first end 108A and a second end 108B. The hollow members 102 are preferably round and substantially cylindrical in shape as shown in FIG. 1. The hollow members are preferably made of plastic, but other materials can be used including rubber, metal or wood.

The first hollow member 102A includes a first hollow member space 110A inside the first hollow member 102A. The second hollow member 102B includes a second hollow member space 110B inside the second hollow member 102B. The third hollow member 102C includes a third hollow member space 110C inside the third hollow member 102C. The third hollow member space 110C is sized large enough so that the third hollow member 102C acts as a sleeve as shown, for example, in FIG. 3 and FIG. 4.

Figure 3:
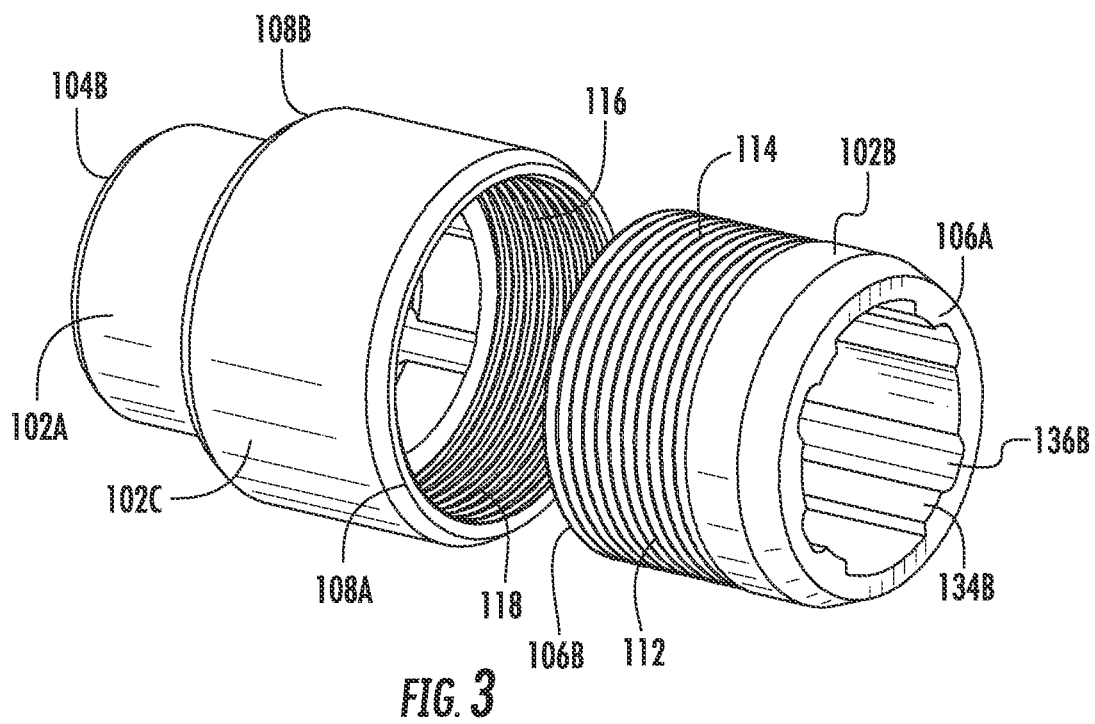
FIG. 3 shows a drawing of a perspective view of the screw lock apparatus from FIG. 1 and FIG. wherein the third hollow member has been slid across the first hollow member and is partially overlapping the first hollow member.
Figure 4:
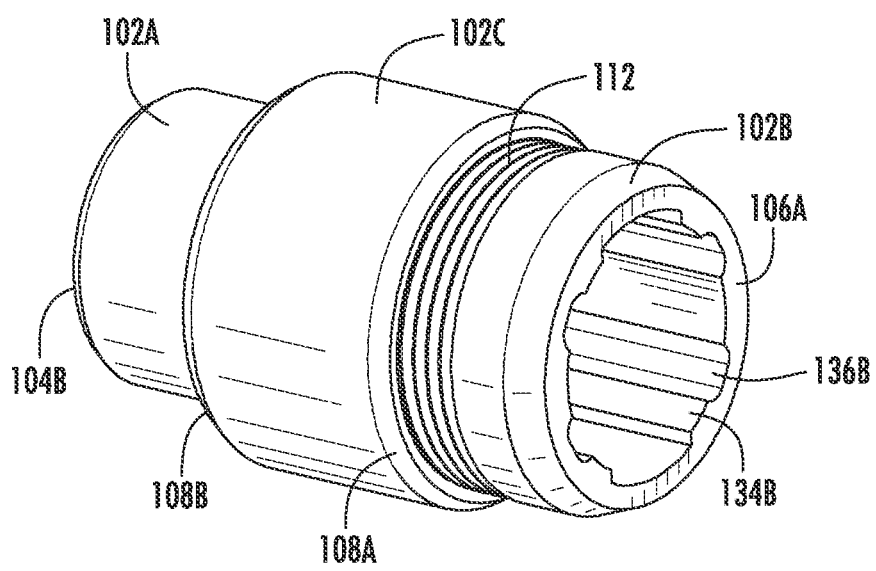
FIG. 4 shows a drawing of a perspective view the screw lock apparatus of FIGS. 1-3 in an assembled configuration wherein the third hollow member has been screwed onto the second hollow member and is partially overlapping the first hollow member and the second hollow member.

As shown in FIG. 1 and FIG. 3, the second hollow member 102B includes a first screw thread 112 along an outer surface 114 of the second hollow member 102B. The third hollow member 102C includes a second screw thread 116 along an inner surface 118 of the third hollow member. The second hollow member 102B and the third hollow member 102C are sized so that the first screw thread 112 is engageable with the second screw thread 116 when the screw lock apparatus 100 is assembled in an assembled configuration on a pair of joined welding lead connectors as shown, for example, in FIGS. 9-12. FIG. 4 shows the screw lock apparatus 100 in an assembled configuration without any welding leads. When in the assembled configuration, the third hollow member 102C acts as a sleeve securing the first hollow member 102A to the second hollow member 102B.

The first end 104A of the first hollow member 102A includes an outwardly extending first ridge 120 as shown in FIG. 1 and FIG. 2. The second end 108B of the third hollow member 102C includes an inwardly extending second ridge 122 as shown, for example, in FIG. 11 and FIG. 12. When the screw lock apparatus 100 is in an assembled configuration with the first screw thread 112 engaged with the second screw thread 116, the second ridge 122 comes into contact with the first ridge 120 such that the first ridge 120 blocks the second ridge 122, thereby preventing the third hollow member 102C from proceeding further along the first hollow member 102A and the second hollow member 102B.

The first hollow member 102A preferably includes an inner first recess 124A along the first end 104A of the first hollow member 102A. Similarly, the second hollow member 102B preferably includes an inner second recess 124B along the second end 106B of the second hollow member 102B. The first recess 124A is sized and configured to fit around an end bulge 126A of a first welding lead connector 128A as shown, for example, in FIGS. 6, 11, and 12. Similarly, the second recess 124B is sized and configured to fit around an end bulge 126B of a second welding lead connector 128B. Because of a tight fit of the first hollow member 102A on the first welding lead connector 128A, a first inner wall 130A in the first hollow member 102A defined by the first recess 124A prevents the first welding lead connector 128A from escaping or otherwise slipping out of the first hollow member 102A. Similarly, because of a tight fit of the second hollow member 102B on the second welding lead connector 128B, a second inner wall 130B in the second hollow member 102B defined by the second recess 124B prevents the second welding lead connector 128B from escaping or otherwise slipping out of the second hollow member 102B.

An inner surface 132A of the first hollow member 102A includes a plurality of ridges 134A defining a plurality of channels 136A. The defined channels 136A are configured for accommodating lengthwise ridges 138A along an outer surface 140A of the first welding lead connector 128A. The plurality of ridges 134A prevent the first welding lead connector 128A from twisting inside the first hollow member 102A. An inner surface 132B of the second hollow member 102B includes a plurality of ridges 134B defining a plurality of channels 136B. The defined channels 136B are configured for accommodating lengthwise ridges 138B along an outer surface 140B of the second welding lead connector 128B. The ridges 134B prevent the second welding lead connector 128B from twisting inside the second hollow member 102B.

FIGS. 5-13 show method for securing a first welding lead 128A to a second welding lead 128B using the screw lock apparatus 100. FIG. 5 and FIG. 6 show the first hollow member 102A, the second hollow member 102B, and the third hollow member 102C being lined up to be connected together to secure a first welding lead connector 128A to a second welding lead connector 128B. A first step 200 includes sliding the first hollow member 102 onto the first welding lead connector 128A wherein the first welding lead connector 128A extends into the first hollow member space 110A. A second step 202 includes sliding the second hollow member 102B onto the second welding lead connector 128B wherein the second welding lead connector 128B extends into the second hollow member space 110B such that the first end 104A of the first hollow member 102A preferably abuts against the second end 106B of the second hollow member as shown, for example, in FIG. 7 and FIG. 8.

Figure 11:
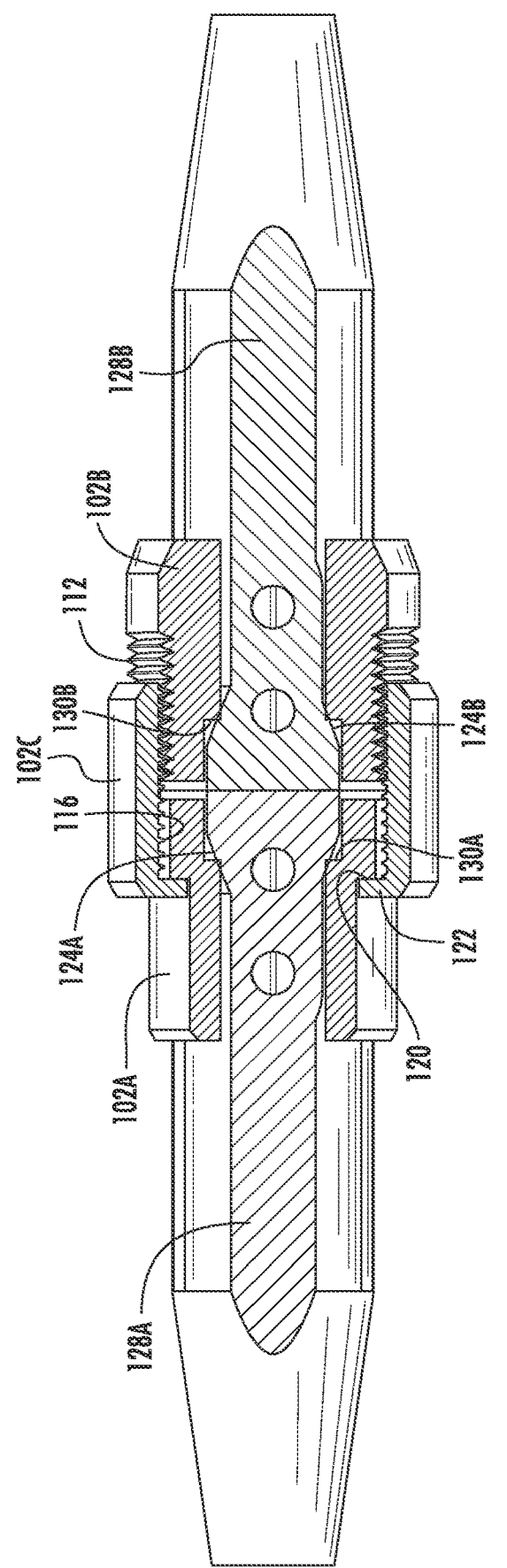
FIG. 11 shows a drawing of a side partial cutaway view of the screw lock apparatus in an assembled configuration assembled onto a pair of welding lead connectors revealing that the third hollow member is screwed onto the second hollow member, holding the first hollow member against the second hollow member and securing together the pair of connected welding lead connectors.
Figure 12:
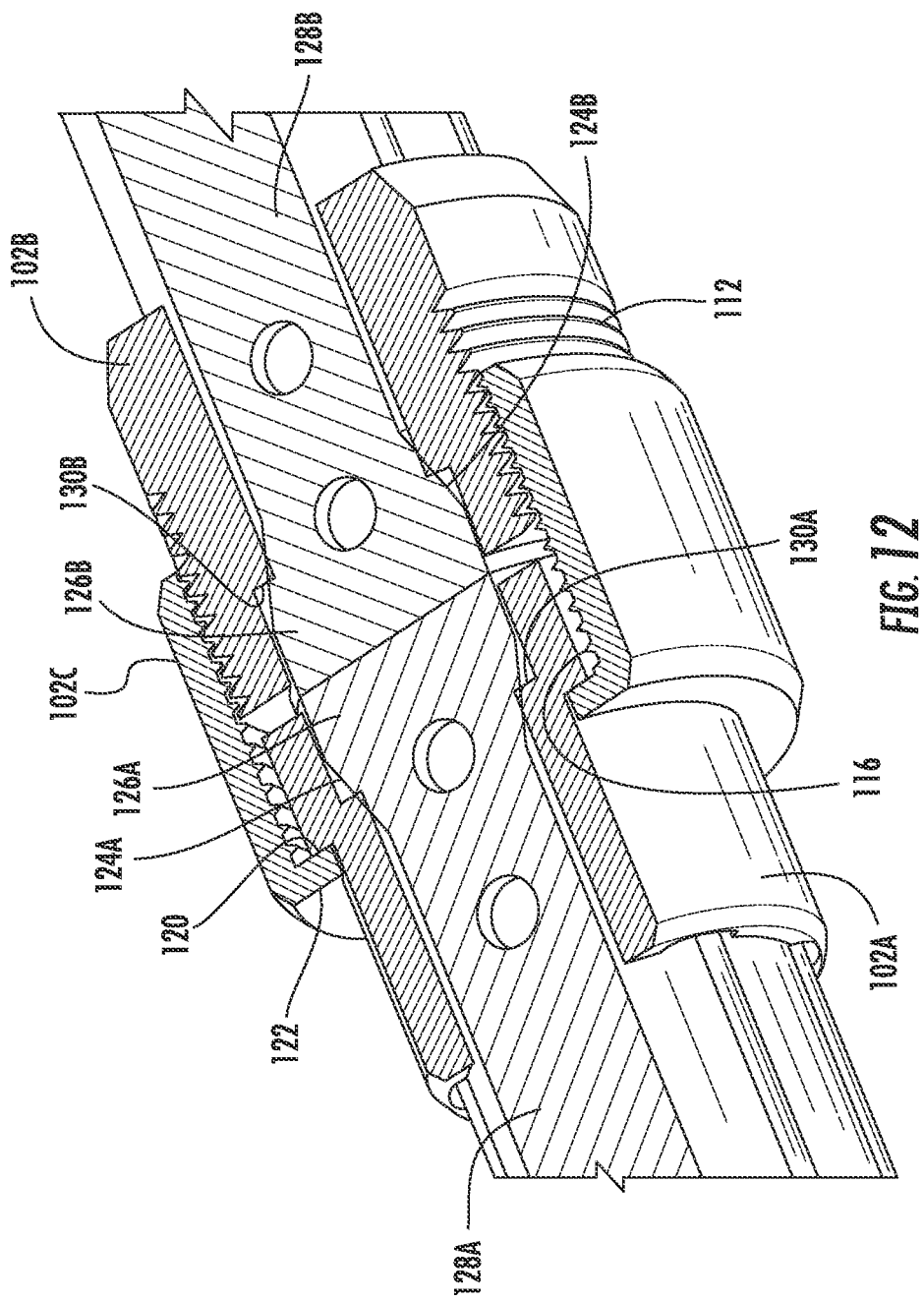
FIG. 12 shows a drawing of a perspective partial cutaway view of the screw lock apparatus in an assembled configuration assembled onto a pair of welding lead connectors revealing that the third hollow member is screwed onto the second hollow member, holding the first hollow member against the second hollow member and securing together the pair of connected welding lead connectors.
Figure 13:
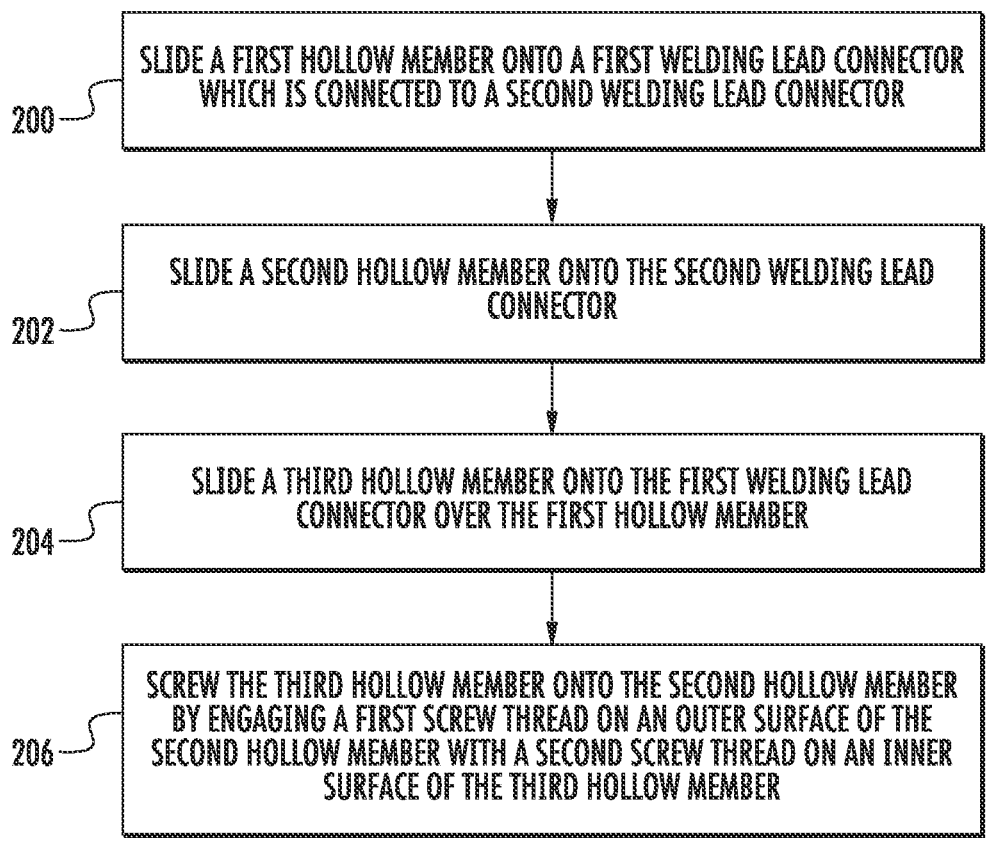
FIG. 13 shows a flowchart showing a method for securing two welding lead connectors together.

Although steps are provided in a preferred order, the method described herein is not intended to be limited to the exact order as outlined in FIG. 13. For example, step 200 and step 202, may be done in reverse order. A third step 204 includes sliding the third hollow member 102C onto the first welding lead connector 128A, over the first hollow member 102A. A fourth step 206 includes screwing the third hollow member 102C onto the second hollow member 102B by engaging the first screw thread 112 with the second screw thread 116. The fourth step 206 preferably proceeds until the second ridge 122 of the third hollow member 102C abuts against the first ridge 120 of the first hollow member 102A. At this point, the screw lock apparatus 100 is in the assembled configuration shown in FIGS. 9-12. FIG. 11 and FIG. 12 show partial cutaway views of the screw lock apparatus 100 in the assembled configuration with the first screw thread 112 engaged with the second screw thread 116 so that the third hollow member 102C is tightened onto the first hollow member 102A and the second hollow member 102B, holding the first hollow member 102A next to the second hollow member 102B tightly. In the assembled configuration when assembly is made on joined welding lead connectors as shown in FIGS. 9-12, the welding lead connectors 128 are secured together and will not come apart unless the screw lock apparatus 100 is disassembled. To disassemble the screw lock apparatus 100, the steps described above are reversed. The third hollow member 102C is unscrewed from the second hollow member 102B and is slid off of the first hollow member 102A. The first hollow member 102A and the second hollow member 102B are then removed from the welding lead connectors 128A and 128B, respectively.

The screw lock apparatus 100 may be provided in the form of a kit including the first hollow member 102A, the second hollow member 102B, and the third hollow member 102C as shown, for example, in FIG. 1 and FIG. 2.

The screw lock apparatus 100 has multiple advantages. An important advantage is that it provides a mechanically simple and affordable way to secure welding lead connectors together. This helps prevent accidental disconnection of welding lead connectors or accidental arcing caused by loose welding lead connectors. The screw lock apparatus 100 can come in a variety of colors so that, when multiple welding leads are used, the various welding lead connections can be color coded and distinguished from one another. The screw lock apparatus 100 is easily assembled and disassembled on a job site. The preferred physical configuration of the first hollow member 102A and the second hollow member 102B as shown in FIG. 1 effectively ensnare joined welding lead connectors 128A and 128B, preventing them from escaping or otherwise disconnecting form one another. This is accomplished in part by the first inner wall 130A holding the end bulge 126A of the first welding lead 128A in place so that it cannot slip through and escape the first hollow member space 110A. This is further accomplished in part by the second inner wall 130B holding the end bulge 126B of the second welding lead 128B in place so that it cannot slip through and escape the second hollow member space 110B.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶

What is claimed is:

1. An apparatus for securing a first welding to a second welding lead, the apparatus comprising:
   a. a first hollow member defining a first hollow member space, the first hollow member further comprising:
      i. a first end;
      ii. a second end; and
      iii an outward facing first ridge along the first end of the first hollow member;
   b. a second hollow member defining a second hollow member space, the second hollow member further comprising:
      i. a first end;
      ii. a second end; and
      iii. a first screw thread along an outer surface of the second hollow member; and
   c. a third hollow member defining a third hollow member space wherein the first end of the first hollow member and the second end of the second hollow member are held proximate to one another inside the third hollow member space, the third hollow member further comprising:
      i. a first end;
      ii. a second end;
      iii. a second screw thread along an interior surface of the third hollow member wherein the second screw thread is engaged with the first screw thread of the second hollow member; and
      iv. an inward facing second ridge along the first end of the third hollow member wherein the inward facing second ridge is adjacent to the outward facing first ridge of the first hollow member and blocks the outward facing first ridge from moving relative to the inward facing second ridge, thereby securing the first hollow member to the second hollow member,
   wherein the second hollow member further comprises a plurality of parallel lengthwise ridges along an inner surface of the second hollow member wherein the plurality of ridges define a plurality of parallel lengthwise channels along the inner surface of the second hollow member, wherein the plurality of channels are configured to physically accommodate lengthwise ridges along a welding lead connector when the second hollow member is slid onto a welding lead connector.

2. The apparatus of claim 1, wherein the plurality of parallel lengthwise ridges is a second plurality of parallel lengthwise ridges, wherein the plurality of channels is a second plurality of channels, wherein the first hollow member further comprises a first plurality of parallel lengthwise ridges along an inner surface of the first hollow member wherein the first plurality of ridges define a first plurality of parallel lengthwise channels along the inner surface of the first hollow member, wherein the first plurality of channels are configured to physically accommodate lengthwise ridges along a welding lead connector when the first hollow member is slid onto a welding lead connector.

3. A kit of disassembled parts of a screw lock apparatus for securing a first welding to a second welding lead, the kit comprising:
   a. a first hollow member defining a first hollow member space, the first hollow member further comprising:
      i. a first end;
      ii. a second end; and
      iii. an outward facing first ridge along the first end of the first hollow member;
   b. a second hollow member defining a second hollow member space, the second hollow member further comprising:
      i. A first end;
      ii. a second end; and
      iii. a first screw thread along an outer surface of the second hollow member; and
   c. a third hollow member defining a third hollow member space, the third hollow member further comprising:
      i. a first end;
      ii. a second end;
      iii. a second screw thread along an interior surface of the third hollow member; and
      iv. an inward facing second ridge along the first end of the third hollow member,
   wherein the second hollow member further comprises a plurality of parallel lengthwise ridges along an inner surface of the second hollow member wherein the plurality of ridges define a plurality of parallel lengthwise channels along the inner surface of the second hollow member, wherein the plurality of channels are configured to physically accommodate lengthwise ridges along a welding lead connector when the second hollow member is slid onto a welding lead connector.

4. The kit of claim 3, wherein the plurality of parallel lengthwise ridges is a second plurality of parallel lengthwise ridges, wherein the plurality of channels is a second plurality of channels, wherein the first hollow member further comprises a first plurality of parallel lengthwise ridges along an inner surface of the first hollow member wherein the first plurality of ridges define a first plurality of parallel lengthwise channels along the inner surface of the first hollow member, wherein the first plurality of channels are configured to physically accommodate lengthwise ridges along a welding lead connector when the first hollow member is slid onto a welding lead connector.

5. A method for securing a first welding lead connector to a second welding lead connector, the method comprising:
   a. connecting the first welding lead connector to the second welding lead connector;
   b. sliding a first hollow member onto the first welding lead connector, wherein the first hollow member has a first end, a second end, and an outward facing first ridge along the first end of the first hollow member;
   c. sliding a second hollow member onto the second welding lead connector, wherein the second hollow member has a first end, a second end, and a first screw thread along an outer surface of the second hollow member, wherein the first end of the first hollow member is proximate to the second end of the second hollow member;
   d. sliding a third hollow member onto the first hollow member;
   e. screwing the third hollow member onto the second hollow member, wherein the first end of the first hollow member and the second end of the second hollow member are held proximate to one another inside the third hollow member space, wherein the third hollow member has a first end, a second end, and a second screw thread along an interior surface of the third hollow member that engages with the first screw thread of the second hollow member, wherein the third hollow member includes an inward facing second ridge along a first end of the third hollow member, and wherein the inward facing second ridge is adjacent to the outward facing first ridge of the first hollow member and blocks the outward facing first ridge from moving relative to the inward facing second ridge, thereby securing the first hollow member to the second hollow member,
wherein the second hollow member further comprises a plurality of parallel lengthwise ridges along an inner surface of the second hollow member wherein the plurality of ridges define a plurality of parallel lengthwise channels along the inner surface of the second hollow member, wherein the plurality of channels are configured to physically accommodate lengthwise ridges along a welding lead connector when the second hollow member is slid onto a welding lead connector.

* * * * *